INVENTORS
ERNEST H. JOHNSON
ANDREW C. LINDMARK
BY
Paul M. Gest
ATTORNEY

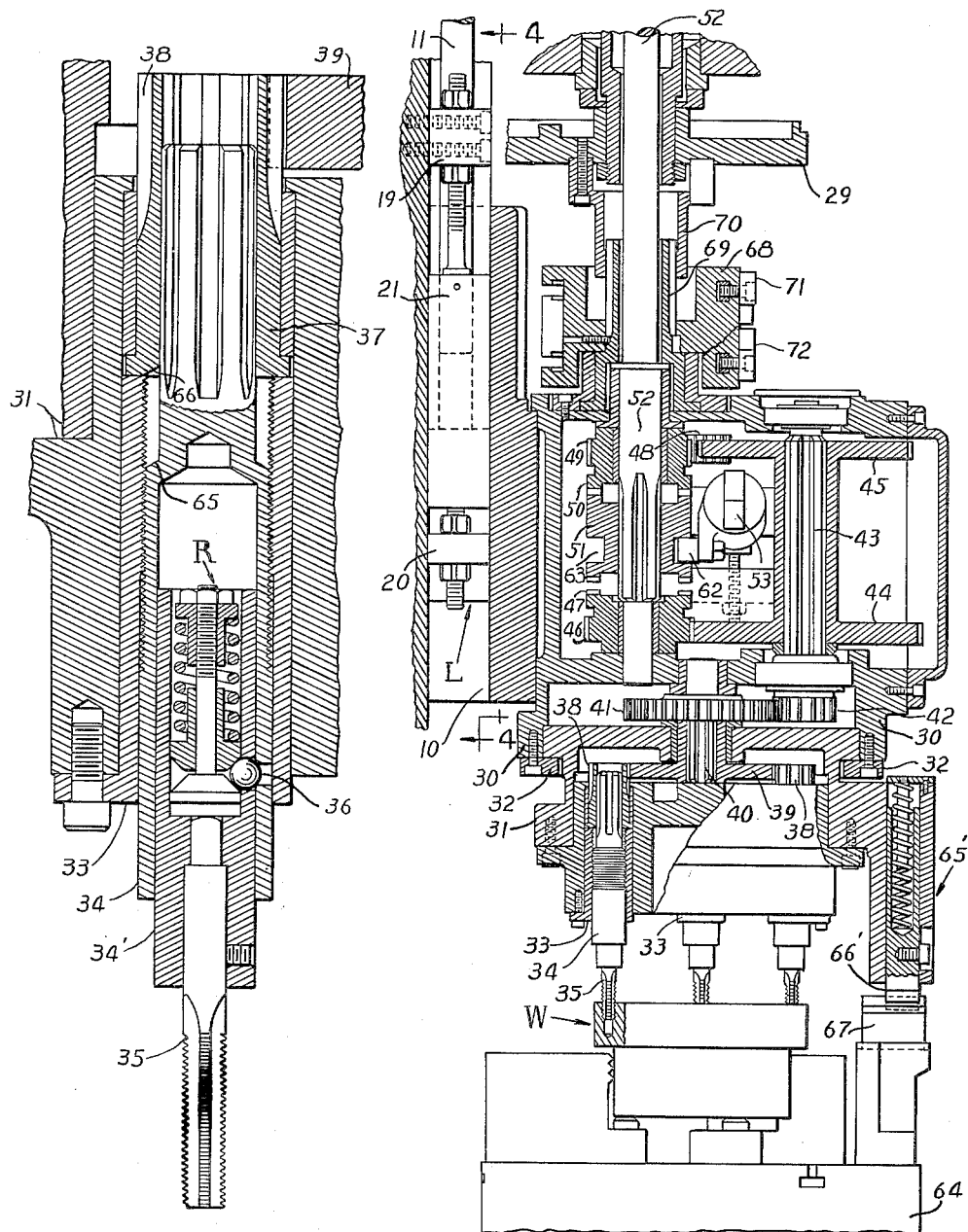

Patented Oct. 28, 1952

2,615,183

UNITED STATES PATENT OFFICE 2,615,183

TAPPING ATTACHMENT

Ernest H. Johnson and Andrew C. Lindmark, Bridgeport, Conn., assignors to The Bullard Company, a corporation of Connecticut Application November 15, 1946, Serial No. 710,198

7 Claims. (Cl. 10—130)

This invention relates to machine tools and particularly to a new and improved tapping attachment for a vertical lathe or drilling machine.

Tapping heads or attachments have always presented serious problems, particularly when they are employed on production machinery. Among these problems, probably the most serious is that relating to the withdrawal of the tap after it has reached depth. The solution to this problem requires simultaneous reversal of rotation and feeding to prevent damage to the tapped threads. It involves particularly critical consideration in automatic production machinery such as, for example, the vertical multiple spindle lathes of the type shown and described in Patent 1,360,175 to E. P. Bullard, which are provided, at each station (except the loading station), with a separate feeding mechanism for moving the tools toward and from work that is being rotated.

An object of this invention is to provide a tapping attachment that will be simple in design, rugged in construction and capable of solving the problems heretofore encountered in tapping work on production lines.

Other objects include, the provision of a tapping head that will insure the movement of one or more taps from a definite location in beginning a tapping operation, and the return to said location upon completion of a tapping operation; the provision of such a tapping head in which an audible detector is employed to indicate when the taps are at the definite location; the provision of such a tapping head in which the threads formed by each tap may be different from the others; the provision of such a tapping head in which a locating device is employed to accurately locate the taps relatively to their holes; the provision of a single reversing clutch for operating the locating mechanism and for feeding the taps; and the provision of a tapping head having all of the above characteristics and including a timing mechanism for causing said head automatically to perform a cycle of operations.

The above, as well as other objects and novel features of the invention will become apparent from the following specification and accompanying drawings, in which:

Fig. 2 is a sectional elevational view taken substantially along line 2—2 of Fig. 1;

Fig. 3 is an enlarged sectional view of part of the apparatus shown in Fig. 2.

Figures 1, 4:
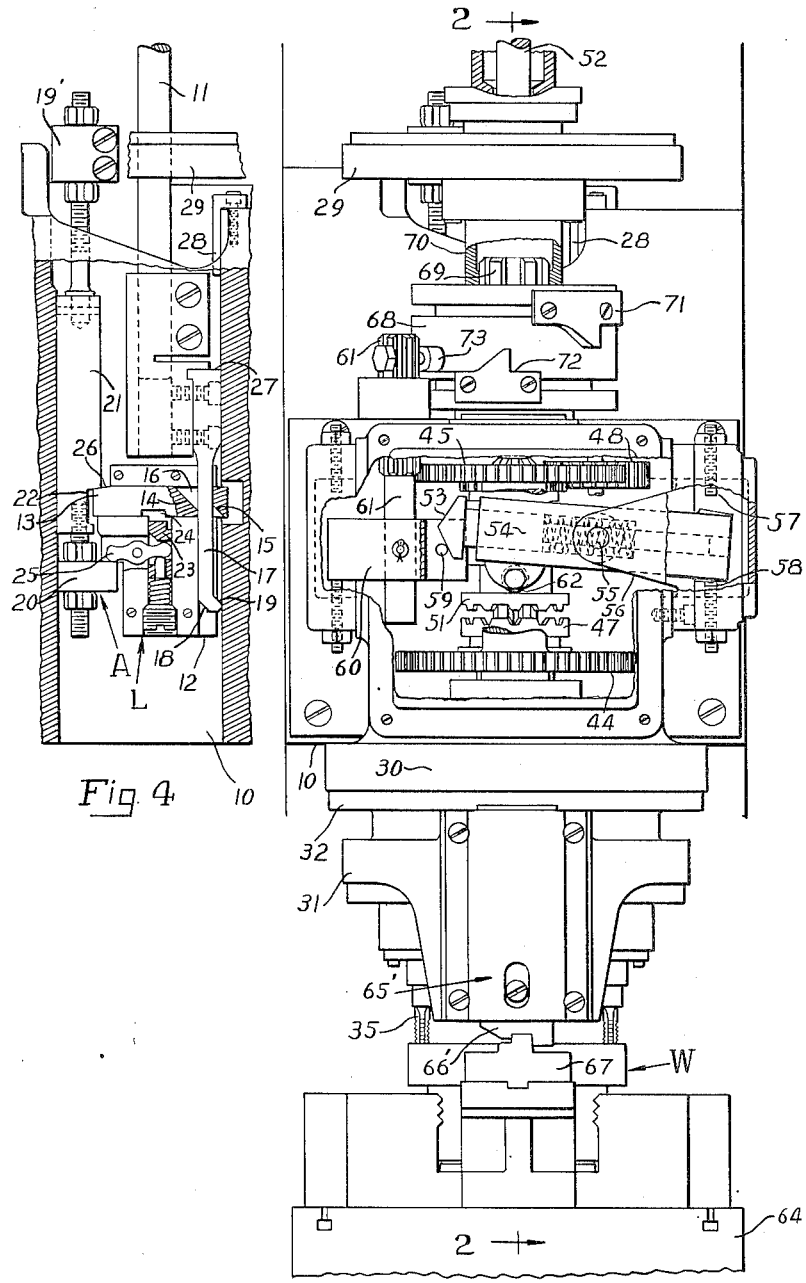
Figure 1 is a front elevational view of part of a multiple-spindle machine tool to which the principles of the invention have been applied.
Fig. 4 is a sectional elevational view taken substantially along line 4—4 of Fig. 2.

Although the principles of the invention are equally applicable to a single station machine, they will be described as applied to one station of a multiple station machine tool of the type shown and described in Patent 1,360,175 in the name of E. P. Bullard.

The machine tool of Patent 1,360,175 includes a plurality of work stations and a single loading station equally spaced about a central column. A separate feedworks transmission is provided at each station except the loading station for moving a tool supporting saddle 10 through the action of a cam that vertically reciprocates a rod 11. Referring to Fig. 4, the saddle 10 is provided with a locking mechanism L that cooperates with rod 11 to raise and lower saddle 10. The saddle 10 is freely movable in a vertical direction along ways formed on the central column of the machine. It is provided with a bracket 12 that supports a bolt 13 for horizontal reciprocation. The bolt 13 includes cam surfaces 14, 15 within an opening 16 extending therethrough. A link 17 fixed to the rod 11 is provided with cam surfaces 18, 19 that are adapted to cooperate with cam surfaces 14, 15 respectively.

An abutment device A is attached to the machine frame by a collar 19' and includes an abutment 20 adjustably fixed to a link 21 having a notch 22 therein for receiving one end of the bolt 13.

The cam (not shown) of the feedworks of Patent 1,360,175 moves rod 11 downwardly and with it saddle 10 relatively to abutment A through the engagement of cam surfaces 14 and 18 which tend to move bolt 13 leftwardly but which does not occur due to the engagement of a spring detent 23 with a notch 24. When the saddle 10 reaches a pre-determined position in its downward travel, abutment 20 engages a link 25 retracting detent 23 which permits bolt 13 to move leftwardly, so that a cam surface 26 thereon engages the upper edge of slot 22 rigidly locking saddle 10 by the engagement of the top surface of abutment 20 with a shoulder behind link 25, and engagement of the top surface of bolt 13 and the top surface of notch 22.

Continued downward movement of rod 11 and link 17 does not affect saddle 10. When it is desired to raise saddle 10, the feedworks cam causes upward movement of rod 11 raising link 17 until its cam surface 19 withdraws bolt 13 from notch 22 at which time the upper end 27 of link 17 engages the lower end of a gib 28 attached to saddle 10 thereby raising saddle 10 to its upper limit.

A timing disc 29 is rotated with the feedworks cam drum and it includes adjustable dogs for actuating linkage so that the feedworks can move rod 11 downwardly at a rapid traverse rate, then downwardly at a slow feed rate, and finally upwardly at a fast traverse rate.

That which has been described relates mostly to that portion of the apparatus of Patent 1,360,175 necessary to a clear understanding of the invention. Reference is made to this patent for specific details of construction.

The tapping head forming the basis of the present invention includes a frame 30 (Fig. 2) attached to and movable with saddle 10. A rotatable auxiliary frame 31 is journaled within the lower end of frame 30 and is held therein by a ring 32. The auxiliary frame 31 is provided with spindle openings at predetermined intervals for supporting internally threaded stationary sleeves 33. Referring to Fig. 3, the sleeve 33 is threaded to a collet 34 which supports a holder 34' in the bottom of which a tap 35 is fixed. The holder 34' is fixed to the collet 34 through a commercial relieving connection R including a spring loaded ball 36 that will permit tap holder 34' to rise in the event tap 35 meets an obstruction such as being fed into a hole of less depth than is required.

The tap 35 is adapted to be rotated and at the same time fed at a rate such that threads will be formed in the work. Accordingly, collet 34 not only must rotate but it must advance at the correct rate to produce the desired threads. Therefore, the threads between sleeve 33 and collet 34 have the same pitch as the threads of tap 35. Additionally, the upper end of collet 34 is splined to a sleeve 37 rotatably mounted within frame 31. Sleeve 37 is provided with gear teeth 38 on its outer periphery that mesh with a bull gear 39 (Fig. 2). The bull gear 39 meshes with similar gears 38 for each of the taps for the head. It is evident that taps having threads of different pitch may be employed simultaneously since it is only necessary to provide corresponding pitch threads between their corresponding sleeves 33 and collets 34.

Gear 39 is keyed to a shaft 40, to the upper end of which a gear 41 is fixed. Gear 41 meshes with a pinion 42 attached to the lower end of a feathered shaft 43 to which spaced gears 44, 45 are keyed. The gear 44 meshes directly with a gear 46 on a clutch element 47; while gear 45 meshes with an intermediate gear 48, which latter meshes with a gear 49 integral with another clutch element 50. The clutch elements 47 and 50 are adapted to be rotated by a driving clutch 51 splined to a shaft 52 that extends upwardly through the cam drum of the machine of Patent 1,360,175, and which is driven by pick-off gears operating independently of the rotation of the cam drum although driven by the same source of power.

A spring-pressed arrow head 53 (Fig. 1) is mounted in an arm 54 pivoted at 55 to a bracket 56 fixed to frame 30. The tail end of arm 54 is located between limit screws 57, 58. The arrow head cooperates with a pin 59 attached to a collar 60 fixed to a vertically reciprocable rod 61. Arm 54 supports a roller 62 (Fig. 2) that rides in a slot 63 of clutch 51. With the parts in the position shown in Figs. 1 and 2, the location of pin 59 causes arrow head 53 to be in its upper position effecting engagement of clutch 51 with element 50. This causes reverse rotation of the taps 35 retracting them from a work piece W that is held by a non-rotating chuck 64. The taps 35 move upwardly to their upper position which is defined by the engagement of two critical surfaces 65, 66 (Fig. 3) on the collet 34 and sleeve 37, respectively. That is, the surface 66 on axially fixed sleeve 37 is engaged by the surface 65 on axially movable collet 34 causing collet 34 and gear 38 to stop rotating. This normally would cause auxiliary frame 31 to rotate about the axis of shaft 40 but for the fact that it is prevented from so rotating by a locating device 65' that holds the auxiliary frame 31 in fixed relation relatively to the non-rotatable chuck 64. The locating device comprises a spring pressed detent 66' that meshes with a block 67 mounted on a standard fixed to chuck 64.

Non-rotation of frame 31 causes locking of gears 39, 41, 42, 44, 45, 48 and 49, whereupon clutch 51, which continues to rotate, begins to rattle as it is alternately forced into and out of engagement with the teeth of element 50. This rattle provides an audible indicator for insuring engagement between critical surfaces 65 and 66. And, when it occurs it is evident that taps 35 are at a definite location from which they may be fed into the work, and to which they may return upon completion of the tapping operation.

When it is desired to begin the downward feeding of taps 35, clutch 51 must be moved downwardly so that it engages the teeth of element 46. Accordingly, an auxiliary timing disc 68 is keyed to a sleeve 69 splined to a sleeve 70 that is fixed to the main timing disc 29. Accordingly, auxiliary disc 68 rotates with disc 29. Adjustable dogs 71, 72 are adapted to be pre-set on disc 68 for engaging a roll 73 (Fig. 1) attached to the upper end of rod 61. This structure provides means for raising and lowering pin 59 past arrow head 53, thereby to control the operation of clutch 51.

With the apparatus in the position shown, a tapping operation has been completed and the taps are being withdrawn from the work W by the reverse rotation and feeding of collets 34. When the taps have moved to their upper limits, or when the critical surfaces 65, 66 engage, the clutch 51 begins to rattle.

During the initial set up, adjustable dogs on disc 29 have been pre-set to cause rod 11 to move upwardly at traverse speed after this above-mentioned rattle occurs. This action causes link 17 to rise (Fig. 4) withdrawing bolt 13, and surface 27 to engage gib 28 raising saddle 10. Raising of saddle 10 causes spring detent 66' to be released from locating block 67, whereupon the auxiliary frame 31 begins to rotate and the clutch rattle ceases. The saddle 10 moves upwardly until it arrives at the top of its stroke where it remains until another cycle of operations is initiated. This latter is effected by another dog on the main timing disc 29, whereupon saddle 10 is forced downwardly by rod 11, cam surfaces 14 and 18 until locked by the locking mechanism L as previously described. Usually this may be arranged so that the bottom of the taps 35 are only a fraction of an inch from the work at which time detent 66' meshes with block 67 stopping the rotation of auxiliary frame 31 and initiating the before-described rattle. An adjustable dog on the auxiliary timing disc 68 has been previously set to throw clutch 51 downwardly into engagement with element 47 causing downward feed and rotation of taps 35 after the last-mentioned rattle occurs. The taps 35 are then fed to depth, whereupon another dog on disc 68 forces clutch 51 upwardly into engagement with element 50 causing upward feeding and reverse rotation of taps 35 until surfaces 65, 66 engage, etc.

Although the various features of the new and improved tapping attachment have been shown and described in detail to fully disclose one embodiment of the invention, it will be evident that numerous changes may be made in such details and certain features may be used without others, without departing from the principles of the invention.

What is claimed is:

1. In a tapping head for a machine tool, a collet for holding a tap; a tap; a rotatable carrier for said collet, said collet being non-aligned relatively to the axis of said carrier; a sleeve in said carrier surrounding said collet and held against rotation about its own axis; interengaging threads between said collet and sleeve having the same pitch as the threads of said tap; a rotatable axially fixed sleeve splined to said collet including means adapted to limit the axial movement of said collet in one direction; a reversible directional drive for rotating said splined sleeve; resilient means adapted to maintain one of said directional drives in condition to rotate said splined sleeve in a direction to render effective said limiting means; and means adapted to locate said tap with respect to a hole in a work piece comprising a device adapted to hold said carrier against rotation when said tap is properly located.

2. In a machine tool, a saddle; means for reciprocating said saddle at a relatively fast and slow speed; a timing disc including adjustable means adapted to control the speed of reciprocation of said saddle; a tapping head mounted on said saddle having a reversible directional driving means; a resiliently operable clutch adapted to render one of said directional drives effective; a collet within said tapping head adapted to hold a tap; a tap within said collet; a non-rotatable sleeve surrounding said collet; interengaging threads between said collet and sleeve having the same pitch as the threads of said tap; a rotatable axially-fixed sleeve splined to said collet; means on said splined sleeve adapted to limit the axial movement of said collet in one direction; gearing between said reversible drive and said rotatable sleeve; and adjustable means operable in timed relation to that of said timing disc for shifting said clutch.

3. In a machine tool, a saddle; a work support; means adapted to reciprocate said saddle at a relatively fast and slow speed toward and from said work support; a timing disc including adjustable means adapted to control the speed of reciprocation of said saddle; a tapping head mounted on said saddle having a reversible driving means; a resiliently operable clutch adapted to render said reversible drive effective; a collet adapted to hold a tap with its longitudinal axis out of line with that of said work support; a tap mounted within said collet; a rotatable carrier for supporting said collet; a sleeve surrounding said collet and held against rotation about its own axis; interengaging threads between said collet and sleeve having the same pitch as the threads of said tap; a rotatable axially-fixed sleeve splined to said collet; means on said splined sleeve adapted to limit the axial movement of said collet in one direction; gearing between said reversible drive and said rotatable sleeve; adjustable means operable in timed relation to that of said timing disc adapted to shift said clutch; and means adapted to locate said tap relatively to said work support including a device adapted to hold said carrier against rotation when said tap is properly located.

4. A tapping head for a machine tool having a work support comprising in combination, a rotatable carrier; a plurality of collets mounted in said carrier, each adapted to support a tap; a tap in each collet; means adapted to rotate said taps in a forward and a reverse direction while respectively feeding said taps toward and from a work piece; a clutch adapted to change the direction of rotation and feed of said taps; means adapted to limit the reverse feeding of said taps; means adapted normally to maintain said clutch in position to cause reverse rotation of said taps, whereby said limiting means is rendered effective and causing rotation of said carrier; means adapted to locate said taps relatively to said work piece comprising a device adapted to stop the rotation of said carrier and causing said clutch to rattle; and means adapted to shift said clutch to rotate and feed said taps in a forward direction subsequently to the development of said clutch rattle.

5. In a machine tool, a saddle; means adapted to reciprocate said saddle at a relatively fast and slow speed; a timing disc in driving relation with said reciprocating means including adjustable means adapted to control the speed of reciprocation of said saddle; a tapping head mounted on said saddle having a reversible driving means; a resiliently operable clutch adapted to render said reversible drive effective; a carrier forming part of said tapping head; a plurality of collets mounted in said carrier, each adapted to support a tap; a tap in each collet; sleeves surrounding each of said collets and held against rotation about their own axes; interengaging threads between said collets and their corresponding sleeves having the same pitch as the threads of said tap; rotatable, axially-fixed sleeves splined to said collets; means on said sleeves adapted to limit the axial movement of its corresponding collet; gearing between said reversible drive and said rotatable sleeves; and adjustable means operable in timed relation to that of said timing disc adapted to shift said clutch.

6. In a machine tool, a work support; a saddle adapted to be moved toward and away from said work support; a tapping attachment mounted on said saddle and including a frame journaled for rotation about its longitudinal axis; a rotatable collet supported by said rotatable frame with its longitudinal axis out of line with that of said frame; a sleeve fixed against rotation about its own axis and threaded to said collet; means between said sleeve and collet adapted to limit relative axial movement thereof in one direction; means adapted to rotate said collet including a driving gear train and a reversing clutch, said driving gear train causing said frame to rotate about its longitudinal axis when said limiting means is effective; and additional means on said frame adapted to cooperate with means on said work support to stop the rotation of said frame in a pre-determined position relatively to said work support when said saddle is at a pre-determined location in its path of movement.

7. In a machine tool, a work support; a saddle adapted to be moved at traverse and feed rates toward and away from said work support; a timing disc adapted to be set to cause said saddle to change its rate of motion; a tapping attachment mounted on said saddle and including a frame journaled for rotation about its longitudinal axis; a collet supported by said rotatable frame with its longitudinal axis out of line with that of said frame; a sleeve fixed against rotation about its own axis and threaded to said collet; abutment means within said sleeve for limiting the axial movement of said collet within said sleeve in one direction; a drive for said frame including a reversing clutch having teeth resiliently urged into meshing relation, the construction and arrangement of the parts being such that said clutch rattles when said limiting means is effective and said frame is held against rotation, but does not rattle when said frame is rotating or said limiting means is ineffective; means on said frame adapted to cooperate with means on said work support to stop the rotation of said frame when said collet is in a pre-determined rotary position relatively to said work support; and an auxiliary timing disc adapted to operate said reversing clutch in timed relation with the movement of said saddle.

ERNEST H. JOHNSON.
ANDREW C. LINDMARK.

REFERENCES CITED

The following references are of record in the file of this patent:

UNITED STATES PATENTS

| Number | Name | Date |
|---|---|---|
| 960,295 | Evans | June 7, 1910 |
| 1,070,590 | Evans | Aug. 19, 1913 |
| 1,219,537 | Dalton | Mar. 20, 1917 |
| 1,360,175 | Bullard | Nov. 23, 1920 |
| 1,656,759 | Saylor | Jan. 17, 1928 |
| 1,681,288 | Galloway | Aug. 21, 1928 |
| 1,700,980 | Galloway | Feb. 5, 1929 |
| 1,747,111 | Galloway | Feb. 11, 1930 |
| 1,909,055 | Hageman | May 16, 1933 |
| 1,998,275 | Emrick | Apr. 16, 1935 |
| 2,368,359 | Hellstrom | Jan. 30, 1945 |
| 2,405,718 | Schafer | Aug. 13, 1946 |